(12) United States Patent
Momose (10) Patent No.: US 8,143,077 B2
(45) Date of Patent: Mar. 27, 2012

(54) MICROCHIP AND METHOD OF MANUFACTURING MICROCHIP

(75) Inventor: Shun Momose, Kyoto (JP)

(73) Assignee: Rohm Co., Ltd., Kyoto-shi, Kyoto (JP)

( * ) Notice: Subject to any disclaimer, the term of this patent is extended or adjusted under 35 U.S.C. 154(b) by 942 days.

(21) Appl. No.: 12/129,869

(22) Filed: May 30, 2008

(65) Prior Publication Data

US 2008/0296734 A1    Dec. 4, 2008

(30) Foreign Application Priority Data

May 30, 2007   (JP) ................................. 2007-143606

(51) Int. Cl.
*H01L 21/66* (2006.01)
(52) U.S. Cl. .......................................... 438/16
(58) Field of Classification Search ................. 438/7, 67, 438/456
See application file for complete search history.

(56) References Cited

U.S. PATENT DOCUMENTS

| | | | |
|---|---|---|---|
| 6,750,076 B2* | 6/2004 | Corso | 438/48 |
| 2005/0026346 A1* | 2/2005 | Blankenstein et al. | 438/200 |
| 2008/0156079 A1 | 7/2008 | Momose et al. | |
| 2009/0084738 A1 | 4/2009 | Momose | |
| 2009/0098658 A1 | 4/2009 | Momose et al. | |
| 2009/0104077 A1 | 4/2009 | Momose | |
| 2009/0111675 A1 | 4/2009 | Yokogawa et al. | |
| 2009/0135407 A1 | 5/2009 | Kageyama et al. | |
| 2009/0142232 A1 | 6/2009 | Okada et al. | |
| 2009/0155125 A1 | 6/2009 | Michiue et al. | |
| 2009/0232708 A1 | 9/2009 | Yokogawa et al. | |

FOREIGN PATENT DOCUMENTS

| | | |
|---|---|---|
| JP | 02-28130 | 11/1990 |
| JP | 03-094856 | 4/1991 |
| JP | 05-331438 | 12/1993 |
| JP | 07-024391 | 1/1995 |
| JP | 08-141487 | 6/1996 |
| JP | 2001-153803 | 6/2001 |
| JP | 2003-145028 | 5/2003 |
| JP | 2004-101892 | 4/2004 |
| JP | 2004-202336 | 7/2004 |
| JP | 2004-340702 | 12/2004 |
| JP | 2006-234613 | 9/2006 |
| JP | 2006-284440 | 10/2006 |

(Continued)

OTHER PUBLICATIONS

U.S. Appl. No. 12/467,404, filed May 18, 2009.

(Continued)

*Primary Examiner* — Chandra Chaudhari
(74) *Attorney, Agent, or Firm* — Fish & Richardson P.C.

(57) ABSTRACT

A microchip formed by joining a first substrate having at least one recess on its surface and a second substrate, wherein small projections of 0.5 to 30 μm in height are formed on at least a part of the surface having the recess of the first substrate, and a coating formed of a surface processing agent is provided on at least a part of the surface having the small projections formed thereon, as well as a method of manufacturing the microchip, are provided. A microchip allowing easy inspection of the state of application or state of adhesion of liquid material such as a surface processing agent, and allowing accurate optical measurement without causing disturbance such as fluorescence, can be provided.

12 Claims, 7 Drawing Sheets

FOREIGN PATENT DOCUMENTS

| | | |
|---|---|---|
| JP | 2006-292668 | 10/2006 |
| WO | 2005/124332 | 12/2005 |
| WO | WO 2006/063063 | 6/2006 |
| WO | 2006/095615 | 9/2006 |
| WO | WO 2007/070093 | 6/2007 |

OTHER PUBLICATIONS

U.S. Appl. No. 12/424,913, filed Apr. 16, 2009.

* cited by examiner

BEFORE APPLICATION    IMMEDIATELY AFTER APPLICATION

AFTER DRYING    AFTER REMOVING SURFACE PROCESSING AGENT

FIG.7B

BEFORE APPLICATION    IMMEDIATELY AFTER APPLICATION

AFTER DRYING    AFTER REMOVING SURFACE PROCESSING AGENT

BEFORE REMOVING SURFACE
PROCESSING AGENT

AFTER REMOVING SURFACE
PROCESSING AGENT

FIG.9B

BEFORE REMOVING SURFACE
PROCESSING AGENT

AFTER REMOVING SURFACE
PROCESSING AGENT

MICROCHIP AND METHOD OF MANUFACTURING MICROCHIP

BACKGROUND OF THE INVENTION

1. Field of the Invention

The present invention relates to a microchip useful as a µ-TAS (Micro Total Analysis System) used for environmental analysis, chemical synthesis and biochemical examination of DNA, protein, cells, blood and the like. The present invention is also related to a method of manufacturing a microchip.

2. Description of the Background Art

Recently, in the field of medical, health, food and drug discovery, importance of sensing, detecting and determining quantity of chemical substance and biological matter such as DNA (Deoxyribo Nucleic Acid), enzyme, antigen, antibody, protein, viruses and cells has been increasing, and various biochips and micro chemical chips (hereinafter generally referred to as microchips) allowing measurement of these have been proposed.

A microchip has a fluid circuit therein, and the fluid circuit mainly consists of various sections including a liquid reagent holding section holding liquid reagent for processing a specimen as the object of examination/analysis (such as blood) or for causing a reaction with the specimen, a mixing section for mixing the specimen with the liquid reagent and a detecting section for analyzing and/or examining the resulting mixture, and fine fluid paths (for example, having the width of a few hundred µm) appropriately connecting these sections to each other.

The microchip having such a fluid circuit enables a series of experiments/analysis operations, which has been conducted in a laboratory, within a chip having the size of a few centimeters square and the thickness of a few millimeters. Therefore, it is advantageous in many aspects. For example, it requires small amount of specimen and reagent, its cost is low, reaction speed is fast and hence examination with high throughput is possible, and the result of examination can be provided at the site where the specimen is taken. The microchip as such has been suitably used, for example, for biochemical examination such as blood test.

Generally, a microchip is fabricated by joining a first plastic substrate having a recess (trench) forming the fluid circuit and a second plastic substrate not having any recess on its surface, such that the fluid circuit is formed in the microchip. Here, in order to improve controllability of liquid moving through the fluid circuit and to prevent the liquid from adhering and remaining on the inner wall of fluid circuit, sometimes that surface of the first plastic substrate which has the recess (trench) formed thereon is subjected to water-repellant finishing, by applying a coating agent or the like in advance.

Here, in continuous production of microchips, when surface processing agent such as the coating agent is applied to the substrate surface, it is preferred to have a step of confirming, substrate by substrate, whether or not the surface processing agent has been reliably applied to the substrate surface. This is to prevent the risk that an ejecting portion of an applicator used for applying the surface processing agent clogs during continuous production and the surface processing agent is not actually applied.

Japanese Patent Laying-Open Nos. 2003-145028, 2001-153803, 08-141487, 07-24391 and 05-331438 disclose methods of inspecting state of application of liquid material such as a coating agent or adhesive agent. According to the methods, fluorescent dye is introduced to the liquid material, the surface to which the liquid material has been applied is irradiated with ultraviolet ray, and fluorescence emitted by the fluorescent dye in the liquid material is detected, to inspect the state of application of the liquid material. It is common in biochemical examination or environmental analysis using microchips that the reactant prepared in the microchip is analyzed at a detecting section of the microchip using optical measurement. Here, the detection light beam is directed to the detecting section of the microchip, and the transmitted or reflected light is detected. It is often the case that the detection light involves ultraviolet ray. If the detection light involves ultraviolet ray and the coating agent containing fluorescent dye has been applied to the inner wall of fluid circuit, fluorescence as a disturbance would generate when irradiated with the detection light beam. This hinders accurate optical measurement.

Further, an additive such as the fluorescent dye mentioned above may possibly hinder reaction between the specimen and the reagent for test in the microchip, or it may possibly be eluted to the reagent for test or to the mixture of specimen and reagent, making it difficult to attain highly accurate measurement. Therefore, in a microchip to be subjected to optical measurement and the like, a surface processing agent containing an additive such as a fluorescent dye cannot be used.

SUMMARY OF THE INVENTION

The present invention was made to solve the above described problems and its object is to provide a microchip that allows easy inspection of the state of application or adhesion of a liquid material such as a surface processing agent, and allows accurate optical measurement without causing disturbance of fluorescence or the like.

Another object of the present invention is to provide a method of manufacturing a microchip including the step of inspecting the state of application of a liquid material such as a surface processing agent applied to a substrate surface, allowing inspection of the state of application of the applied liquid material in a simple manner, without using fluorescence that may hinder accurate optical measurement.

The present invention provides a microchip, formed by joining a first substrate having at least one recess on its surface and a second substrate, wherein small projections of 0.5 to 30 µm in height are formed on at least a part of the surface having the recess of the first substrate; and a coating formed of a surface processing agent is provided on at least a part of the surface having the small projections formed thereon.

Here, the small projections described above may be formed on the entire surface having the recess of the first substrate, except for the contact surface to be joined with the second substrate.

The present invention further provides a method of manufacturing a microchip, including the steps of: forming a first substrate having at least one recess on its surface and small projections of 0.5 to 30 µm in height formed on at least a part of the surface having the recess; applying a surface processing agent on the surface having the recess; removing the surface processing agent or a coating of the surface processing agent applied to a contact surface to be joined to a second substrate; and joining the contact surface to be joined of the first substrate to the second substrate, to obtain a microchip.

By way of example, the small projections may be formed at least on the contact surface to be joined to the second substrate.

In the method of manufacturing a microchip of the present invention as described above, it is preferred to provide, after the step of applying the surface processing agent, the step of irradiating the surface having the small projections with light, to inspect the state of application of the surface processing agent.

Further, the method may further include, after the step of applying the surface processing agent, the step of drying the applied surface processing agent to provide a coating, and in that case, preferably, the method further includes, after the step of removing the surface processing agent or the coating formed of the surface processing agent, the step of irradiating the contact surface to be joined to the second substrate with light, to inspect the state of removal of the coating.

More specifically, the state of application of the surface processing agent or the state of removal of the coating is inspected by irradiating the surface having small projections or the contact surface having small projections to be joined to the second substrate with white light and by observing luminance of diffused reflection from the surface irradiated with white light.

The present invention further provides a method of manufacturing a microchip, including the steps of: forming a first substrate having at least one recess on its surface and small projections of 0.5 to 30 μm in height formed on at least a part of the surface having the recess; applying a surface processing agent on the surface having the recess; drying the applied surface processing agent to obtain a coating; redissolving the coating formed on a contact surface to be joined to a second substrate; removing the redissolved coating; and joining the contact surface to be joined of the first substrate to the second substrate, to obtain a microchip.

The small projections may be formed at least on the contact surface to be joined to the second substrate.

In the method of manufacturing a microchip of the present invention as described above, it is preferred to provide, after the step of applying the surface processing agent, the step of irradiating the surface having the small projections with light, to inspect the state of application of the surface processing agent.

Preferably, the method further includes, after the step of removing the redissolved coating, the step of irradiating the contact surface to be joined to the second substrate with light, to inspect the state of removal of the redissolved coating.

More specifically, the state of application of the surface processing agent or the state of removal of the redissolved coating is inspected by irradiating the surface having small projections or the contact surface having small projections to be joined to the second substrate with white light and by observing luminance of diffused reflection from the surface irradiated with white light.

The microchip in accordance with the present invention allows easy inspection of the state of application or adhesion of the surface processing agent during the steps of manufacturing. Therefore, efficiency of manufacturing process can be improved. Further, when the microchip in accordance with the present invention is used, it becomes unnecessary to introduce fluorescent dye to the surface processing agent. Therefore, the optical measurement using the microchip is free of fluorescence as a disturbance, and hence, highly accurate measurement becomes possible. Further, the problem that an additive such as fluorescent dye hinders reaction in the microchip or that the additive elutes to the reagent for test, can be prevented.

Further, the method of manufacturing a microchip in accordance with the present invention allows easy inspection of the state of application of applied liquid material or state of removal of the liquid material without using fluorescence that may hinder accurate optical measurement and, therefore, efficiency of manufacturing process can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<<Microchip>>

The present invention relates to a microchip. In the present specification, "microchip" refers to a chip that allows various chemical synthesis or various examinations/analyses using a fluid circuit formed therein. Though the size of a microchip is not specifically limited, it may be a few centimeters wide and a few centimeters long and it may have the thickness of a few millimeters. The microchip is typically used mounted on an apparatus that can impart centrifugal force to the chip. Specifically, by applying centrifugal force in an appropriate direction to the microchip, a specimen as the object of examination/analysis (such as blood sample when biochemical examination is to be done using the microchip) and liquid reagent such as the reagent for test are measured and mixed, and specific component in the mixture is detected.

The microchip has a fluid circuit therein. Though not specifically limited, the fluid circuit includes, by way of example, an introducing section for introducing the specimen as the object of examination/analysis, a reagent holding section for holding liquid reagent, a measuring section for measuring the amount of liquid reagent and of the specimen, a mixing section for mixing the measured liquid reagent and the specimen, and a detecting section for analyzing and/or examining the mixture obtained by processing of the specimen with the liquid reagent or obtained by the reaction of the specimen with the liquid reagent. Other sections may be provided as needed.

The sections described above are arranged at appropriate positions to allow measurement of amounts of liquid reagent and specimen, mixture of the specimen with various liquid reagents and examination/analysis of the mixture successively, and connected appropriately through fine flow paths. Examination/analysis of the mixture mentioned above (for example, the detection of the specific component in the mixture) is performed, by way of example, by irradiating the detection section with light beam and by detecting intensity of transmitted or reflected light, or by measuring absorption spectra of the mixture held in the detection section, though not limited to such methods.

Figure 1:
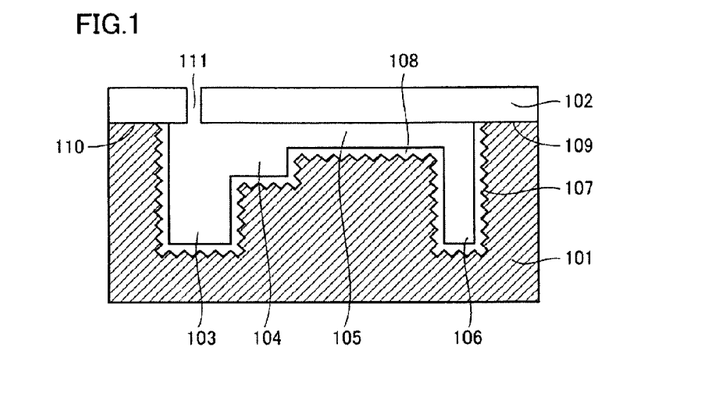
FIG. 1 is a schematic cross sectional view showing an example of a microchip in accordance with the present invention.

The structure of the microchip in accordance with the present invention will be described with reference to FIG. 1. FIG. 1 is a schematic cross sectional view showing an example of a microchip in accordance with the present invention. The microchip of the present invention is formed by joining a first substrate 101 having recesses 103 to 106 on its surface with a second substrate 102, such that the second substrate 102 closes the recesses. The recesses form, with the lower surface of the second substrate 102, the fluid circuit of the microchip. The second substrate 102 has an introducing section 111 for introducing the specimen as the object of examination/analysis. The number and size (width, depth etc.) of the recesses are not specifically limited, and appropriately selected in consideration of the desired structure of fluid circuit. The method of joining the two substrates is not specifically limited. For example, a joining surface of at least one of the first and second substrate may be welded and joined, or the substrates may be joined by using an adhesive.

Each of the first and second substrates 101 and 102 may be formed, for example, of polyethylene terephthalate (PET), polymethylmethacrylate (PMMA), polycarbonate (PC), polypropylene (PP), polystyrene (PS), polyvinyl chloride (PVC), cyclic polyolefin (COP) or the like. The first and second substrates 101 and 102 may be of different materials. Considering better adhesiveness or welding property, however, use of the same material is preferred. Further, the first and second substrates 101 and 102 may be transparent substrates, and they may be made black by adding carbon black or the like to the resin.

Figure 2:
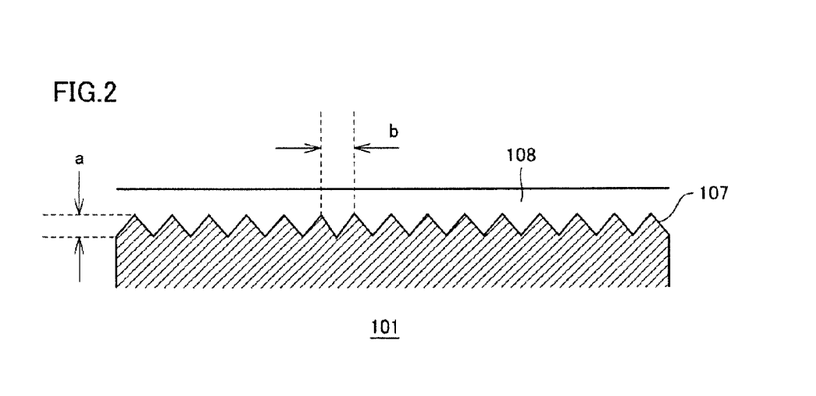
FIG. 2 is a schematic cross sectional view showing, in enlargement, a portion of the small projections of the microchip shown in FIG. 1.

As can be seen from FIG. 1, on the bottom surfaces and on the entire sidewalls of recesses 103 to 106, that is, entirely on that surface of first substrate 101 which has recesses 103 to 106 except for the contact surfaces 109 and 110 to be joined with the second substrate 102, small projections 107 are formed. FIG. 2 is a schematic cross sectional view showing, in enlargement, a portion of the small projections of the microchip shown in FIG. 1. The height of projections of small projections 107 (that is, distance a of FIG. 2) is at least 0.5 μm and at most 30 μm, and preferably, at most 5 μm. As will be described in detail later, when the height is smaller than 0.5 μm, in the inspection to confirm whether the liquid material such as the surface processing agent is reliably applied to the surface or not during the process of manufacturing microchips, the difference between when the liquid material is applied and when not is not very clear. If the height exceeds 30 μm, even when a prescribed amount of liquid material is applied to the surface, it cannot be distinguished from when not applied dependent on the method of inspection as will be described later and, in order to clearly distinguish when the liquid material has been applied from when not, it is necessary to apply excessive liquid material to form a coating of sufficient thickness, wasting the liquid material such as the surface processing agent.

The pitch of small projections, that is, the distance from a peak to another peak (distance b in FIG. 2) is not specifically limited and, by way of example, it may be about 0.5 to 30 μm. In order to clearly distinguish when the liquid material has been applied from when not, about 0.5 to about 5 μm is preferred. The small projections may be irregular.

The first substrate 101 having the recesses and small projections may be fabricated by using a metal mold with small projections formed thereon by etching, discharge treatment or blasting in the injection molding process. Alternatively, a substrate having recesses is formed by using a metal mold and, thereafter, the substrate surface may be polished using abrasive paper, to form small projections on the polished surface.

It is not always necessary that the small projections 107 are formed on the entire surface except for the contact surfaces 109 and 110 for joining to the second substrate 102. It is sufficient to form projections at least on a portion of the surface to which the liquid material such as the surface processing agent is applied. By irradiating the surface having the small projections with light, whether the liquid material has been applied or not can be recognized, by the inspecting method described later.

The microchip shown in FIG. 1 has a coating 108 formed of the liquid material such as the surface processing agent, formed on the surface having the small projections. The surface processing agent refers to a substance that provides the substrate surface with a certain characteristic and, in the present invention, it is in the form of liquid material. The liquid material includes a substance that itself is liquid, a solution of a substance (surface processing agent or the like) dissolved in a solvent, or a slurry with certain solid substance dispersed in a solvent. Though not limiting, specific examples of the surface processing agent include water repellent agent such as fluororesin and silicone resin, and protein absorption inhibitor such as MPC (2-methacryloyl-oxyethyl-phosphorylcholine) polymer or the like. By applying the water repellent agent to the bottom surface and sidewall surfaces of the recess, that is, to the inner wall surfaces of the fluid circuit, controllability of the liquid (specimen, reagent for test and mixture of these) moving through the fluid circuit can be improved, and the liquid can be prevented from adhering or remaining on the inner wall surface of the fluid circuit.

Thickness of coating 108 is not specifically limited, and any thickness may be selected as long as the effects of improving controllability of liquid (specimen, liquid reagent and mixture of these) moving through the fluid circuit and preventing the liquid from adhering or remaining on the inner wall surface of fluid circuit, can be attained. The amount of application of the liquid material such as the surface processing agent is not specifically limited, either, and the amount commonly used in the field of art is used. In the present invention, the height of small projections is set to 0.5 to 30 μm and preferably 0.5 to 5 μm as described above and with the height in this range, it is possible to confirm the state of application of liquid material such as the surface processing agent by the inspection method described later, when the commonly used amount of liquid material such as the surface processing agent is applied. If the amount of application of liquid material such as the surface processing agent is too small for the height a of small projections 107, whether the liquid material has been reliably applied or not cannot always be confirmed by the inspection method described later. If the commonly used amount of liquid material such as the surface processing agent is applied, typically, the coating 108 comes to have the thickness of about 1 to 10 μm.

It is sufficient that the coating 108 of liquid material such as the surface processing agent is formed at least on apart of the surface on which small projections 107 are formed. In order to effectively improve liquid controllability and to effectively prevent adhesion or residue, it is preferred that the coating is formed on the entire surface having the small projections, and it is more preferred that the coating is formed entirely on the surface except for the contact surfaces 109 and 110 to be joined to the second substrate 102. Similar coating may be formed on the lower surface (forming the inner wall surface of the fluid circuit) of the second substrate 102.

By the microchip in accordance with the present invention, it becomes possible to easily inspect whether the liquid material such as the surface processing agent has been reliably applied to the substrate surface or not during the steps of manufacturing the microchips, by the simple method described later. Therefore, efficiency of the manufacturing process can be improved. Further, when the microchip of the present invention is used, it is unnecessary to introduce fluorescent dye to the surface processing agent. Therefore, fluorescence as the disturbance does not generate in the optical measurement using the microchip, allowing highly accurate measurement. Further, the problem that an additive such as fluorescent dye hinders reaction in the microchip or that the additive elutes to the reagent for test, can be prevented.

<Modification>

Various modifications may be made to the microchip in accordance with the present invention shown in FIG. 1 within the scope of the invention. For instance, the microchip shown in FIG. 1 has small projections only in the fluid circuit. Similar small projections may be made on an outer surface of the microchip. Generally, the microchip has, at a part of the fluid circuit, a reagent holding section for holding the liquid reagent such as the reagent for test to be mixed and causing reaction with the specimen, and it is necessary to introduce in advance the liquid reagent to the reagent holding section. When the liquid is introduced, liquid drop may unintentionally splash and adhere to the outer surface of the microchip. Adhesion of liquid on the outer surface is undesirable as it leads to insufficient amount of introduction or unsatisfactory closing of the introduction opening. On the other hand, it is difficult to check whether liquid has adhered or not visually or by means of image recognition camera. By providing small projections additionally on the outer surface of the microchip, it becomes possible to confirm adhesion of liquid by a simple method as will be described later. Consequently, insufficient introduction of reagent or unsatisfactory closing of introduction opening for the reagent can be prevented.

<<Method of Manufacturing Microchip>>

Next, the method of manufacturing a microchip in accordance with the present invention will be described with the embodiments. The method of manufacturing a microchip in accordance with the present invention is preferably employed for manufacturing of the microchip of the present invention.

First Embodiment

The method of manufacturing a microchip in accordance with the present embodiment includes the following steps.

(1) Substrate forming step of forming a first substrate having at least one recess on its surface and small projections with the height of 0.5 to 30 μm formed at least on a part of the surface having the recess;

(2) application step of applying a surface processing agent on the surface having the recess;

(3) surface processing agent removing step of removing the surface processing agent or a coating formed of the surface processing agent applied to a contact surface to be jointed to a second substrate; and (4) joining step of joining the contact surface of the first substrate to the second substrate.

In the following, the method of manufacturing a microchip in accordance with the present embodiment will be described in detail with reference to FIGS. 3A to 3D. FIGS. 3A to 3D show exemplary steps of manufacturing the microchip in accordance with the present invention, in schematic cross sections of the microchip at some steps of manufacturing the microchip.

(1) Substrate Forming Step

Figure 3A:
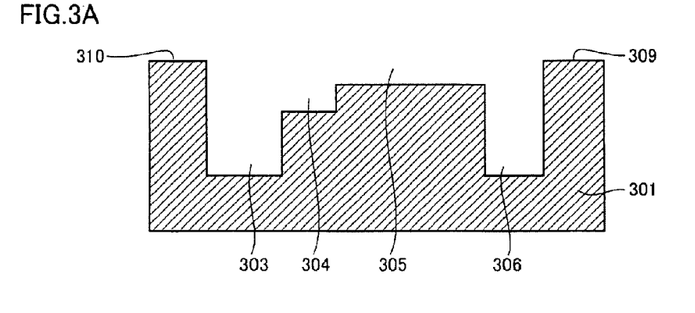
FIGS. 3A to 3D are schematic cross sections showing exemplary steps of manufacturing the microchip in accordance with the present invention.

In this step, a first substrate 301 is formed (FIG. 3A). The first substrate 301 has recesses 303 to 306 on one surface. The recesses constitute the fluid circuit in the microchip. The number and shape (width, depth etc.) of the recesses are not specifically limited, and appropriately adjusted in consideration of the desired structure of the fluid circuit. In the present embodiment, the first substrate 301 has small projections on contact surfaces 309 and 310 to be joined to the second substrate 302 (not shown). The height of small projections, that is, the distance from the peak to the bottom is at least 0.5 μm and at most 30 μm and, preferably, at least 0.5 μm and at most 5 μm. Further, the pitch of small projections, that is, the distance from one peak to another is, though not specifically limited, about 0.5 to about 30 μm. In order to clearly distinguish when the liquid material has been applied from when not at the step of inspection as will be described later, about 1 to about 10 μm is preferred. The small projections may be irregular.

The first substrate 301 may be formed of polyethylene terephthalate (PET), polymethylmethacrylate (PMMA), polycarbonate (PC), polypropylene (PP), polystyrene (PS), polyvinyl chloride (PVC), cyclic polyolefin (COP) or the like. The first and second substrates 301 and 302 may be of different materials. Considering better adhesiveness or welding property, however, use of the same material is preferred. Further, the first and second substrates 301 and 302 may be transparent substrates, and they may be made black by adding carbon black or the like to the resin.

The first substrate 301 having the recesses and the small projections may be fabricated by using a metal mold with small projections formed thereon by discharge treatment, etching, or blasting in the injection molding process. Alternatively, a substrate having recesses is formed by using a metal mold and, thereafter, the substrate surface may be polished using abrasive paper, to form small projections on the polished surface.

Formation of small projections is not limited on the contact surfaces 309 and 310 to be joined to the second substrate, and they may be formed on any area selected from the bottom and side surfaces of the recesses and the contact surfaces to be joined to the second substrate. As will be described in detail later, in the present invention, whether the surface processing agent, for example, is applied or not is inspected by irradiating the area where the small projections are formed with light after the step of application and by detecting surface luminance (brightness) of the area using, for example, an image recognizing apparatus. Assuming that the small projections are formed only on a part of the surface having the recesses of first substrate 301 and the state of application of the surface processing agent is inspected by directing light only to the area where the small projections are formed, the result of inspection is substantially relevant to the substrate surface not irradiated with light. Therefore, what is necessary is simply to form small projections on some part of the substrate surface. If it is desirable to more closely inspect the state of application on the entire substrate surface, it is preferred to form the small projections entirely on the bottom and side surfaces of the recesses and the contact surfaces to be joined with the second substrate.

(2) Application Step

Figure 3B:
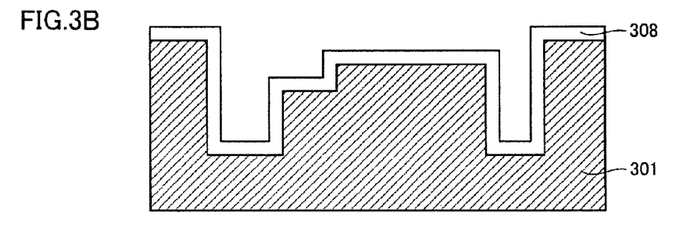

Next, a surface processing agent is applied to the entire surface with recesses, to form a surface processing layer 308 (FIG. 3B). Surface processing layer 308 is of a liquid material containing the surface processing agent or, if dried after application, a coating film of surface processing agent. The surface processing agent refers to a substance that provides a specific characteristic to the substrate surface and, in the present invention, it is in the form of a liquid material. Therefore, the surface processing material may itself be a liquid, or the surface processing material may be dissolved in a solvent and in the form of a solution, or solid surface processing material may be dispersed in a solvent and in the form of slurry. Though not limiting, specific examples of the surface processing material include water repellent agent such as fluororesin and silicone resin, and protein absorption inhibitor such as MPC (2-methacryloyl-oxyethyl-phosphorylcholine) polymer or the like.

By applying the water repellent agent to the bottom surface and sidewall surfaces of the recess, that is, to the inner wall surfaces of the fluid circuit, controllability of the liquid (specimen, reagent for test and mixture of these) moving through the fluid circuit can be improved, and the liquid can be prevented from adhering or remaining on the inner wall surface of the fluid circuit.

The amount of surface processing agent to be applied is not specifically limited as long as the effects of improving controllability of liquid (specimen, liquid reagent and mixture of these) moving through the fluid circuit and preventing the liquid from adhering or remaining on the inner wall surface of fluid circuit can be attained, and an amount generally used in the field of art is applied. In the present invention, the height of small projections is set to 0.5 to 30 μm as described above and with the height in this range, it is possible to confirm the state of application of surface processing agent by the inspection method described later, when the commonly used amount of surface processing agent is applied.

Though not limiting, the method of applying the surface processing agent may include spraying and dipping.

After the step of application, a step of drying the applied surface processing agent may be provided. If the drying process is performed, drying may be done using, for example, a blower at a temperature of 20 to 80° C. If the next step of removing the surface processing agent is performed without drying, it is possible that the surface processing agent on the sidewall or on the bottom of the recess as well as on the contact surface to be joined to the second substrate is undesirably removed, or the surface processing agent on the sidewall or bottom of the recess is undesirably adheres to the contact surface to be joined to the second substrate, and hence, careful handling is necessary. Further, if the surface processing layer is dried after the application step, it follows that the coating formed of the surface processing agent on the contact surface to be joined to the second substrate is removed by polishing or the like in the surface processing agent removing step. At this step, dust and particles of coating would generate, which must be removed carefully.

(3) Surface Processing Agent Removing Step

Figure 3C:
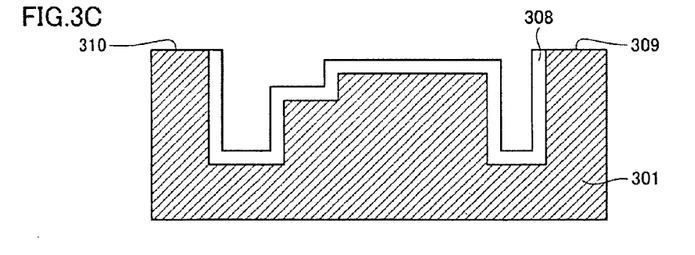

Next, surface processing layer 308 (the surface processing agent or a coating formed of the surface processing agent) applied on the contact surfaces 309 and 310 to be joined to the second substrate is removed (FIG. 3C). This is because the surface processing layer left on the contact surfaces 309 and 310 to be joined to the second substrate degrades adhesion and welding property between the first and second substrates.

If the surface processing layer 308 is not dried, it may be removed by "wiping", with the first substrate 301 pressed to and moved over a wiper. If the surface processing layer 308 is dried, it may be removed by polishing the contact surfaces to be joined, using abrasive paper. If a step of redissolving, which will be described later, is provided, it may be removed by wiping. If the step of redissolving is not provided, careful handling as described above is necessary.

By the above-described wiping or polishing, small projections formed on the contact surfaces 309 and 310 to be joined to the second substrate are also removed, and contact surfaces 309 and 310 to be joined become flat surfaces. That the contact surfaces 309 and 310 to be joined become flat by the surface processing agent removing step can readily be confirmed by the inspection method described later.

(4) Joining Step

Figure 3D:
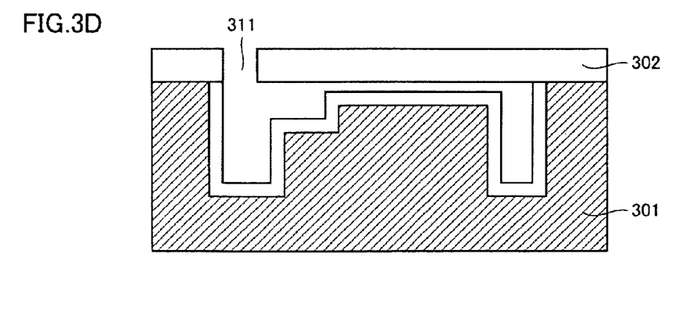

Finally, the contact surfaces 309 and 310 of the first substrate 301 are joined to the second substrate 302 (FIG. 3D). The second substrate 302 has an introducing section 311 for introducing the specimen as the object of examination/analysis. The material of the second substrate is the same as that of the first substrate 310. In order to attain higher adhesiveness and better welding property, it is preferred to form the first and second substrates 301 and 302 of the same material.

The method of joining is not specifically limited and, by way of example, the contact surface of at least one of the first and second substrates may be welded and joined, or the surfaces may be joined by using an adhesive. From the viewpoint of preventing deformation of fluid path at the time of joining, welding is preferred.

By the method in accordance with the present embodiment, small projections are formed on the contact surface to be joined to the second substrate and, therefore, the state of application of the surface processing agent and the state of removal of the surface processing layer can be inspected in a simple method as will be described below. This improves efficiency of the manufacturing process. Further, it becomes unnecessary to add fluorescent dye or the like to the surface processing agent and, therefore, the resulting microchip is free of any problem such as hindrance of reaction or elution to the reagent for test in the microchip.

As described above, the first substrate 301 in accordance with the embodiment above has small projections on the contact surfaces 309 and 310 to be joined to the second substrate. By using the first substrate having such a structure, the state of application of the surface processing agent and the state of removal of surface processing layer 308 on the contact surfaces 309 and 310 to be joined to the second substrate can readily be inspected. The step of inspection is preferably included in the method of manufacturing the microchip in accordance with the present invention. In the following, the inspection step will be described in detail.

(Method of Inspecting State of Application)

Figure 4:
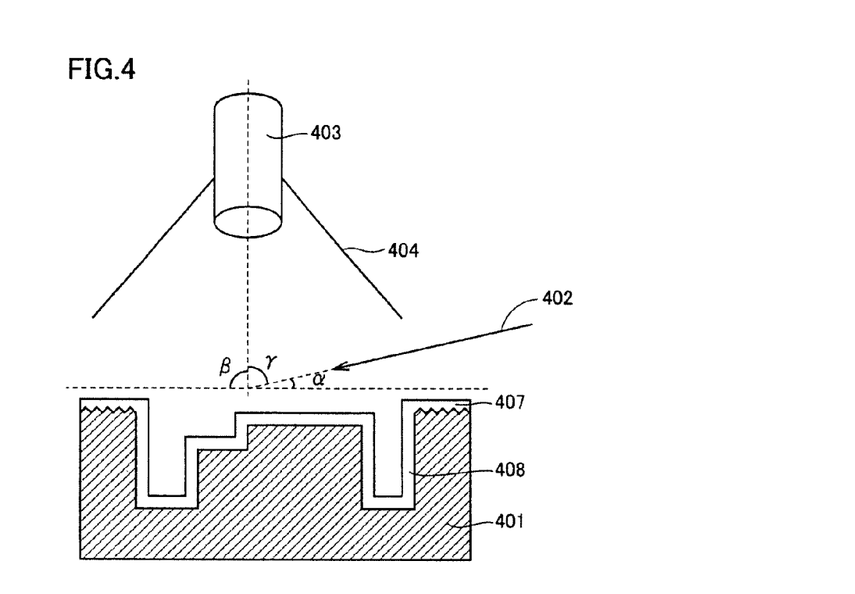
FIG. 4 is a schematic illustration of the method of inspecting the state of application.

FIG. 4 schematically shows the method of inspecting the state of application. As shown in FIG. 4, in the method of inspecting the state of application, first, light (irradiation light 402) is directed to that surface of a first substrate 401 which has small projections 407 (contact surface to be joined to the second substrate in FIG. 4) and a surface processing layer 408 formed thereon. Irradiation light 402 may have any wavelength and may include light of different wavelength. Preferably, it is visible light and, more preferably, white light. The incident angle α of irradiation light (an angle formed by irradiation light 402 and the surface of first substrate 401 having small projections 407) is not specifically limited as long as it is smaller than 90° and, preferably, at most 45° and more preferably, at least 1° and at most 30°. If the incident angle α is large, image recognizing apparatus 403 possibly detects reflection light and, it would be difficult to distinguish whether the surface processing layer 408 is formed or not. In the present specification, the "reflection light" is different from "diffuse reflection light" that will be described later, and the reflection light refers to the light reflected in substantially the same angle as the incident angle α when irradiation light is emitted. The image recognizing apparatus may include, but not limited to, a CCD microscope.

When the surface irradiated with irradiation light 402 has small projections 407, irradiation light 402 is diffused, and part of the diffused reflection light is detected by image recognizing apparatus 403 positioned above the first substrate 401. When the surface irradiated with irradiation light 402 does not have any projections and is flat, diffused reflection does not occur and the irradiation light 402 is reflected in substantially the same direction as the incident angle, from the surface. The reflection light is not detected by image recognizing apparatus 403. The inspection method of the present invention utilizes this phenomenon. In order to remove noise caused by disturbance, a light shielding cover 404 adjusted to an appropriate angle may be mounted on image recognizing apparatus 403. As long as the diffused reflection light from the small projections can be detected, any means for detecting diffused reflection light may be used in accordance with the wavelength of irradiation light, other than the image recognizing apparatus such as the CCD microscope. Other detecting means may, for example, be a photo diode (PD). In the present specification, the "diffused reflection light" refers to light reflected in a plurality of different directions, typically a plurality of unspecified directions, when the substrate surface having small projections is irradiated with the irradiation light.

An angle β formed by image recognizing apparatus 403 and the surface having small projections of the first substrate 401 is not specifically limited and, preferably, set to about 90°. If β is close to 0°, image recognizing apparatus 403 possibly detects reflection light and, it would be difficult to distinguish whether the surface processing layer 408 is formed or not. The angle γ formed by image recognizing apparatus 403 and irradiation light 402 is not specifically limited and, preferably, it is set to 0° to 120° and, more preferably, 45° to 90°.

Figure 5A:
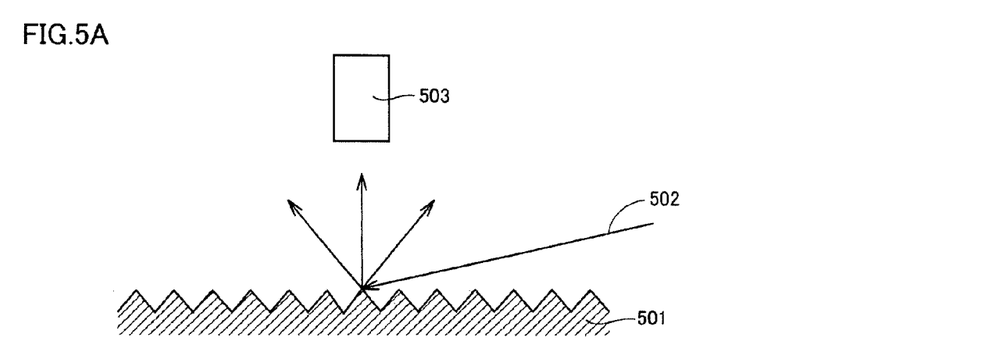
FIGS. 5A and 5B are illustrations more specifically showing the method of inspecting the state of application.
Figure 5B:
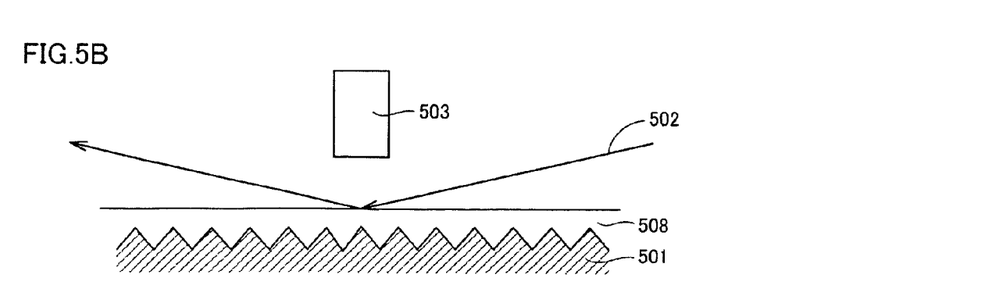

The method of inspecting state of application will be described in greater detail with reference to FIGS. 5A and 5B. When the surface of first substrate 501 having small projections but not having any surface processing layer 508 is irradiated with light, irradiation light 502 is diffused by the small projections and part of the diffused reflected light is detected by an image recognizing apparatus 503 (FIG. 5A). Specifically, in an image obtained by image recognizing apparatus 503, the area having small projections is displayed relatively bright (white) as compared with an area where small projections are not formed. When the surface processing agent is applied and whereby a surface processing layer 508 is formed on small projections, the surface becomes flat and, therefore, diffused reflection does not occur and, image recognizing apparatus 503 does not detect light (FIG. 5B). Therefore, the image obtained from image recognizing apparatus 503 is dark both at the area having small projections and at the area not having the small projections. By observing the variation in luminance (brightness) of the image, it is possible to easily determine whether the surface processing agent has been applied to small projections or not. Specifically, if the area having small projections has been displayed bright in the image obtained before application of the surface processing agent and the area having small projections is displayed relatively dark in the image after application of the surface processing agent, it can be determined that the surface processing agent has actually been applied. In the method of inspection, only the state of application at the area having small projections formed thereon is inspected. If it is determined that the surface processing agent has been applied to the area having small projections formed, it is considered that the agent has also been applied to other areas. In this regard, it is not always necessary to form small projections entirely over one surface of the first substrate.

Here, the variation in luminance (brightness) of the surface having small projections formed thereon in the image obtained from image recognizing apparatus 503 may be determined qualitatively as described above, or it may be determined by digitizing. Digitization may be done by processing the resulting image data using an image measurement software. This allows in-line monitoring of the state of application of surface processing agent in the process of manufacturing microchips.

(Method of Inspecting State of Removal of Surface Processing Layer)

The inspection method described above may be applied to inspection of the state of removal of surface processing layer. Specifically, after the step of removing surface processing agent in the method of manufacturing microchips described above, it is necessary that the surface processing layer is reliably removed on the contact surface to be joined to the second substrate. If the surface processing layer remains, adhesiveness and welding property between the first and second substrates would be degraded. By using the inspection method in accordance with the present invention, it is possible to determine that the contact surface to be joined to the second substrate is made flat by wiping or polishing, if the image of the contact surface to be joined becomes dark. If the step of drying the surface processing agent applied before the step of removing the surface processing agent is provided, the resulting coating comes to form small projections as the solvent in the applied liquid evaporates by drying. Therefore, in that case, the area of contact surface to be joined in the image is displayed bright. By observing the variation in luminance (brightness) as such, whether the surface processing layer has been removed or not can readily be determined.

In the process of manufacturing the microchips, if the step of inspecting the state of removal of surface processing layer is provided, it is preferred that the small projections are formed at the contact surface to be joined to the second substrate.

Second Embodiment

The method of manufacturing microchips in accordance with the present embodiment includes the following steps.

(1) Substrate forming step of forming a first substrate having at least one recess on its surface and small projections with the height of 0.5 to 30 μm formed at least on a part of the surface having the recess;

(2) application step of applying a surface processing agent on the surface having the recess;

(3) drying step of drying the applied surface processing agent to form a coating;

(4) redissolving step of redissolving the coating formed on the contact surface to be joined to the second substrate;

(5) surface processing agent removing step of removing the redissolved coating; and (6) joining step of joining the contact surface of the first substrate to the second substrate.

In the following, the method of manufacturing a microchip in accordance with the present embodiment will be described in detail with reference to FIGS. 6A to 6E. FIGS. 6A to 6E show exemplary steps of manufacturing the microchip in accordance with the present invention, in schematic cross sections of the microchip at some steps of manufacturing the microchip.

Figure 6A:
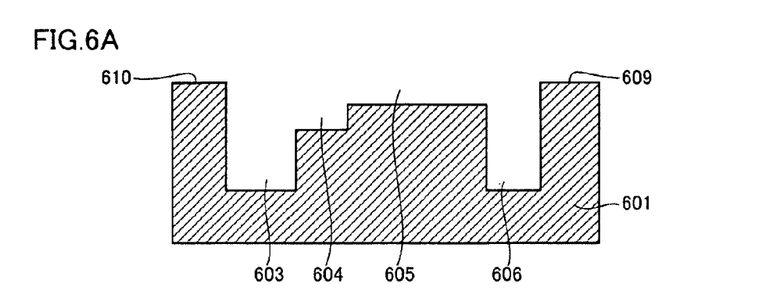
FIGS. 6A to 6E are schematic cross sections showing another exemplary steps of manufacturing the microchip in accordance with the present invention.
Figure 6B:
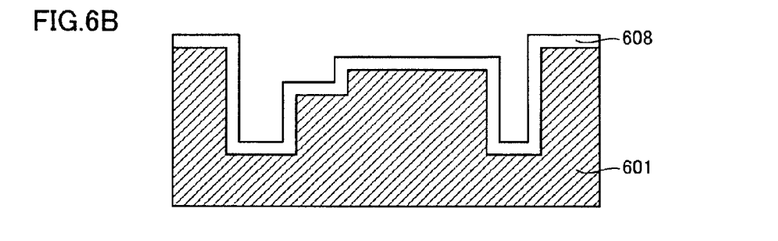

The substrate forming step and the application step are the same as those of the first embodiment described above. Through these steps, the first substrate having recesses 603 to 606 and small projections (not shown) at contact surfaces 609 and 610 to be joined to the second substrate is formed (FIG. 6A), a surface processing agent is applied to that surface on which the recesses are formed, and thus the surface processing layer 608 is formed (FIG. 6B).

Next, the applied surface processing agent is dried, to obtain a coating. For drying, conditions similar to those described with reference to the first embodiment may be applied.

Figure 6C:
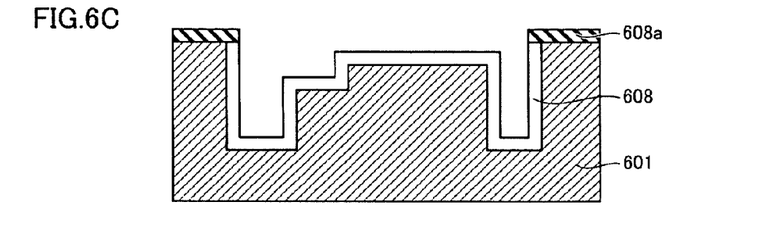

Next, the coating of surface processing agent formed on the contact surfaces 609 and 610 to be joined to the second substrate is redissolved (redissolved surface processing coating 608a of FIG. 6C). As to the method of redissolving the coating formed on contact surfaces 609 and 610 to be joined to the second substrate, a method of bringing a solvent that can dissolve the coating into contact with the coating, such as stamping, rolling, or screen printing, may be used.

By providing such a redissolving step, it becomes possible to avoid the following problems and to obtain flat contact surfaces to be joined on which the surface processing layer is not adhered.

(i) The problem that the surface processing agent not only on the contact surfaces to be joined to the second substrate but also on the sidewall or bottom surface of the recess are undesirably removed, or the surface processing agent on the sidewall or bottom surface of the recess is adhered on the contact surface to be joined to the second substrate, which problem is likely when the surface processing layer is removed by using a wiper or the like without drying the applied surface processing agent; and (ii) the problem of dust and particles possibly generated when the surface processing layer is removed by polishing the contact surface to be joined, using abrasive paper or the like after drying the surface processing layer.

Figure 6D:
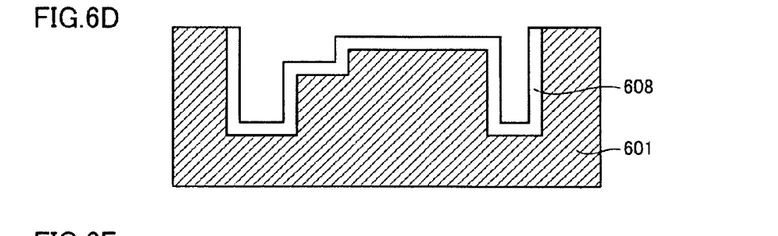
Figure 6E:
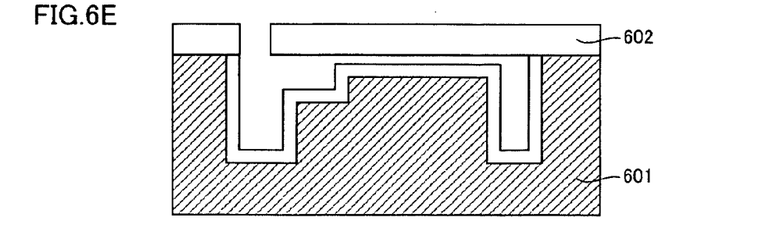

The redissolved coating is removed by using, for example, a wiper, and finally, the second substrate 602 is joined in the similar manner as the first embodiment, whereby a microchip is complete (FIGS. 6D and 6E). After wiping, generally, the height of small projections is reduced to the height of about 0.2 to 0.5 µm, and the height of this range does not affect the adhesiveness and the like in the succeeding joining step.

According to the method of the present embodiment, as there are small projections on the contact surface to be joined to the second substrate, it is possible to inspect the state of application of surface processing agent or state of removal of the surface processing layer by a simple method. Thus, the efficiency of manufacturing process can be improved. Further, it becomes unnecessary to add fluorescent dye or the like to the surface processing agent and, therefore, the resulting microchip is free of any problem such as hindrance of reaction or elution to the reagent for test in the microchip. In addition, the problems (i) and (ii) described above can be avoided.

Here, the method of inspection described with reference to the first embodiment above may also be applied to the present embodiment. Specifically, the state of application of the surface processing agent after the application step and the state of removal of the surface processing layer after the removal step may be inspected by irradiating the surface having small projections with light.

In the following, the present invention will be described in greater detail with reference to specific examples, which are not limiting.

EXAMPLES

Examples 1~2 and Comparative Examples 1~2

In accordance with the method shown in FIGS. 3A to 3D, microchips are fabricated. Contact surfaces to be joined of a transparent substrate (Example 1) of PET having recesses and a black substrate (Example 2) of PET containing carbon and having recesses were polished using abrasive paper, to form small projections having the height (peak to bottom distance) of 0.5 to 5 µm. Further, as Comparative Examples 1 and 2, a transparent substrate (Comparative Example 1) of PET having recesses and not having small projections, and a black substrate (Comparative Example 2) of PET having recesses and not having small projections were prepared. Next, to these substrates (first substrates), a surface processing agent of fluororesin solution (solvent: fluoro-based solvent) of 1% was applied by spray (FIG. 3B), application step), and dried for 3 minutes at a room temperature (drying step). Thereafter, the coating formed of surface processing agent formed on the contact surfaces to be joined to the second substrate was removed by wiping, using a wiper (FIG. 3C), surface processing agent removing step). Finally, these first and second substrates were joined by welding, and microchips were formed (FIG. 3D).

Figure 7A:
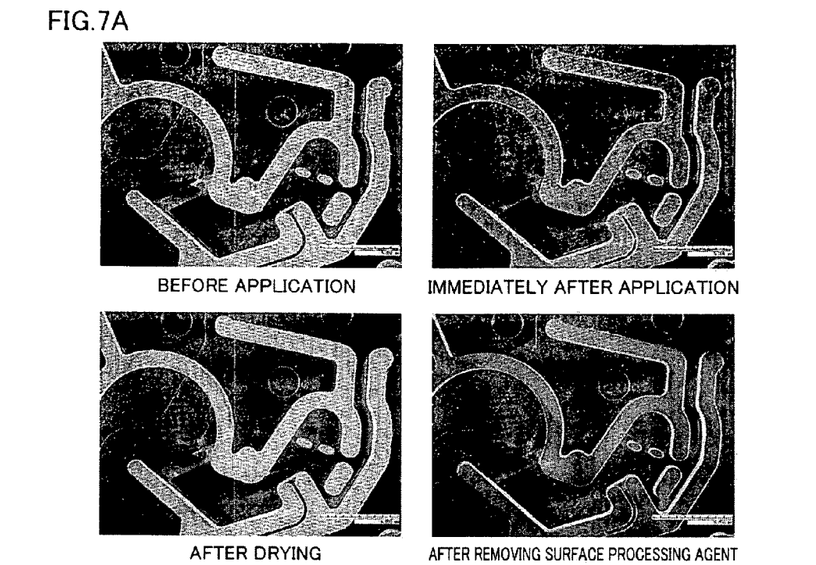
FIGS. 7A and 7B are CCD images taken before and immediately after application of the surface processing agent, after drying step, and after removing the surface processing agent, in Example 1 and Comparative Example 1.
Figure 7B:
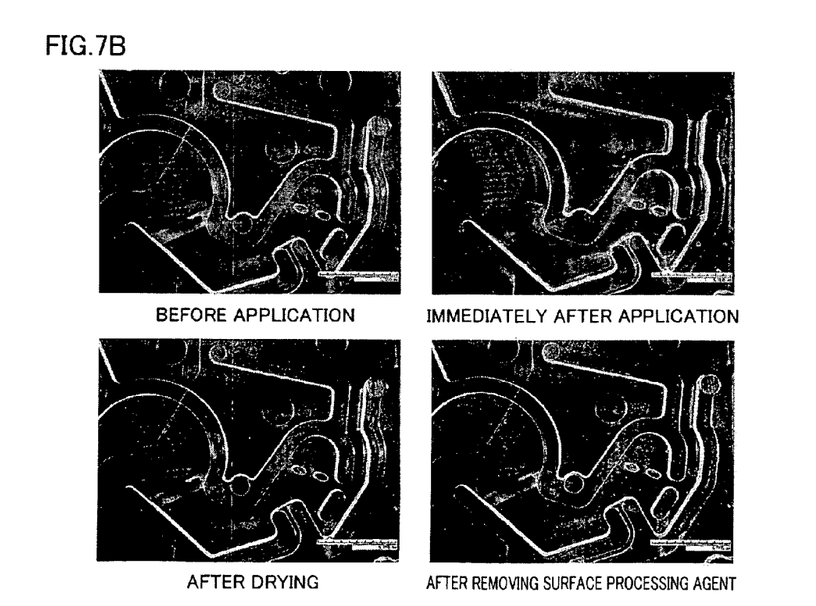
Figure 8A:
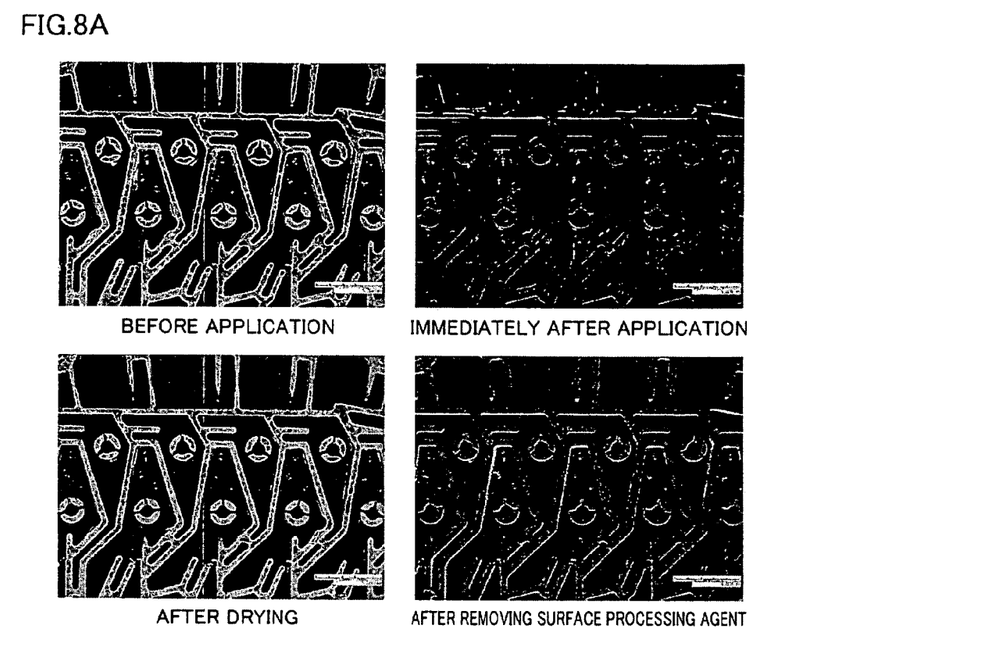
FIGS. 8A and 8B are CCD images taken before and immediately after application of the surface processing agent, after drying step, and after removing the surface processing agent, in Example 2 and Comparative Example 2.
Figure 8B:
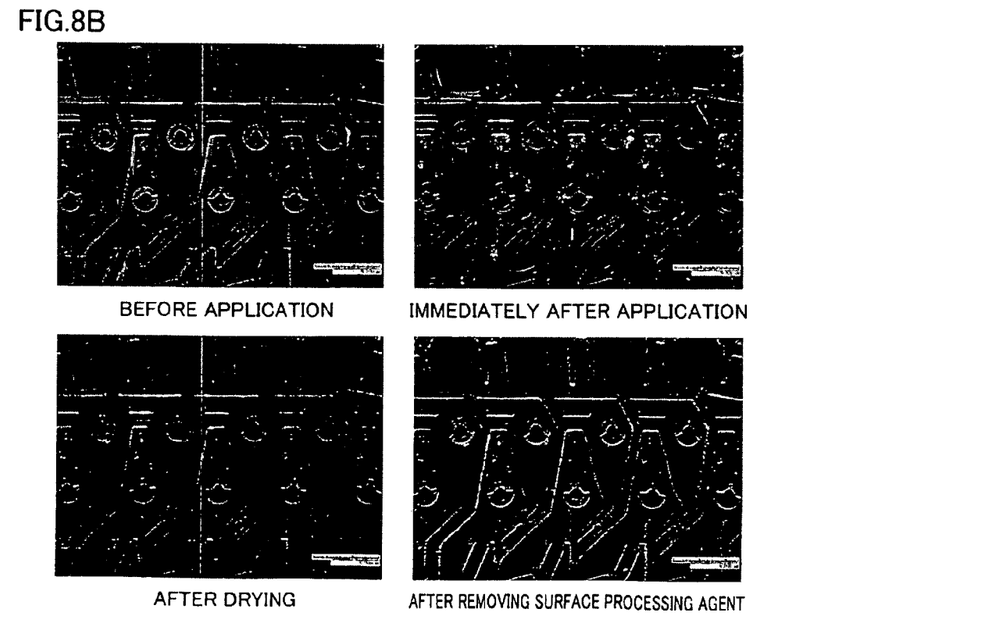

Before and immediately after the step of applying surface processing agent, after the step of drying and after the step of removing surface processing agent, the state of application and the state of removal of coating were inspected by the inspection method shown in FIG. 4. White light was used as the incident light, and the angle α of FIG. 4 (incident angle) was set to 10°. A CCD microscope KH-3000 manufactured by HiROX was used, and the angle β of FIG. 4 was set to about 90°. Resulting CCD images are as shown in FIGS. 7A to 8B. FIG. 7A corresponds to Example 1, and FIG. 7B corresponds to Comparative Example 1. FIG. 8A is a CCD image of Example 2, and FIG. 8B is a CCD image of Comparative Example 2. By way of example, in the CCD image before the step of applying surface processing agent in FIG. 7A, the bright (white) portion corresponds to the contact surface to be joined, where small projections were formed. Dark portions are not provided with small projections.

Both in the transparent substrate (Example 1) and the black substrate (Example 2), before the step of applying surface processing agent and after the step of drying, the contact surfaces to be joined are displayed bright, as compared with the images immediately after the application step or at the step of removing surface processing agent, because of the small projections formed on the contact surface to be joined. As the luminance (brightness) of the contact surface to be joined clearly changes before and after the step of application and before and after the step of removing surface processing agent, it is possible, by observing the change, to easily confirm whether the surface processing agent is applied or surface processing agent is removed. As can be seen from the comparison between FIGS. 7A, 7B and 8A, 8B, variation in luminance is greater in black substrate than in the transparent substrate.

From the resulting CCD images, surface luminance level [a.u.] of contact surfaces to be joined was calculated, using an image measuring software (CV-H3N, manufactured by Keyence Corporation). The results are as shown in Table 1. Luminance level of Table 1 was calculated from the sum of luminance levels of R, G and B. Further, the luminance level was measured at 10 different points on the contact surface to be joined of one substrate, and in Table 1, average, maximum, and minimum values as well as standard deviation are shown.

TABLE 1

|  |  | Average | Max | Min | Standard Deviation σ |
|---|---|---|---|---|---|
| Example 1 | Before application | 548.6 | 594.6 | 473.9 | 39.3 |
|  | Immediately after application | 361.7 | 416.6 | 295.8 | 37.6 |
|  | After drying | 557.6 | 596.7 | 474.9 | 40.0 |
|  | After removal | 301.2 | 426.8 | 231.8 | 65.6 |
| Comparative Example 1 | Before application | 172.6 | 268.9 | 108.0 | 51.3 |
|  | Immediately after application | 142.5 | 259.3 | 101.3 | 48.9 |
|  | After drying | 152.6 | 241.4 | 86.4 | 50.5 |
|  | After removal | 149.2 | 263.5 | 86.8 | 48.6 |
| Example 2 | Before application | 399.3 | 463.3 | 298.1 | 52.4 |
|  | Immediately after application | 61.2 | 80.9 | 48.9 | 10.5 |
|  | After drying | 374.3 | 465.6 | 322.4 | 49.7 |
|  | After removal | 81.3 | 111.4 | 57.8 | 16.6 |
| Comparative Example 2 | Before application | 52.9 | 91.3 | 28.0 | 22.1 |
|  | Immediately after application | 42.1 | 50.0 | 30.1 | 6.8 |
|  | After drying | 38.5 | 65.1 | 25.8 | 11.7 |
|  | After removal | 46.4 | 74.4 | 32.9 | 13.9 |

Figure 9A:
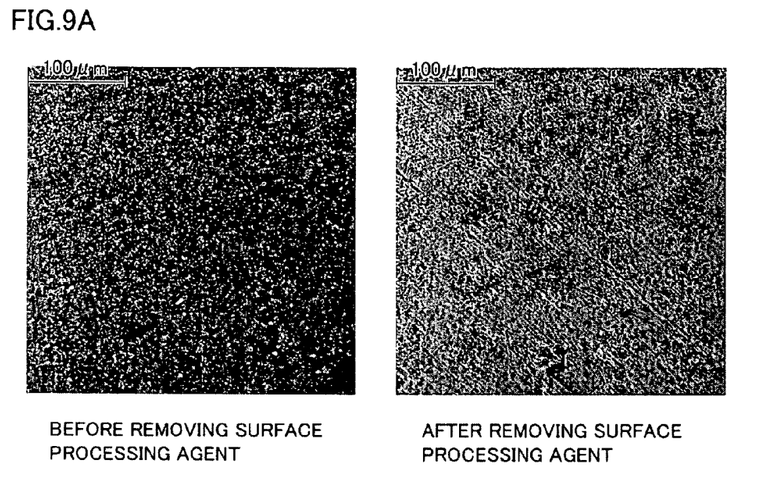
FIGS. 9A and 9B are laser microphotographs of the contact surfaces to be joined before and after the removal of surface processing agent in Example 2 and Comparative Example 2.
Figure 9B:
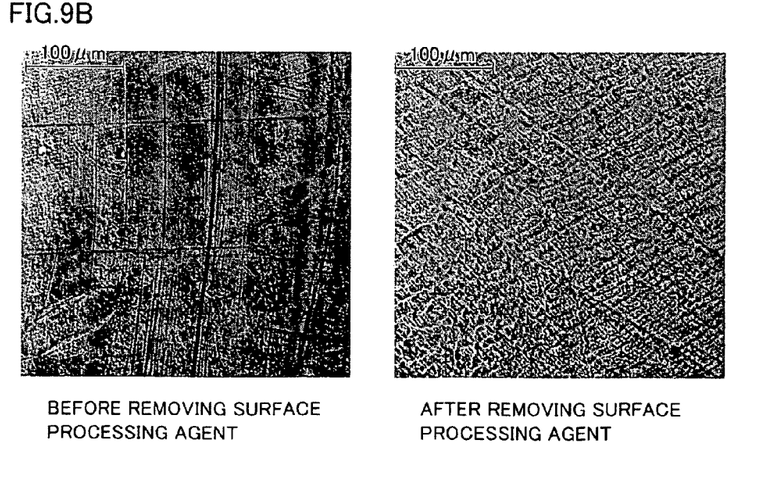

FIGS. 9A and 9B show laser microphotographs of contact surfaces to be joined, before and after the removal of surface processing agent in Example 2 and Comparative Example 2. It can be seen from FIGS. 9 A and 9B that after the step of removing surface processing agent, the surface shape of Example 2 (FIG. 9A) is substantially the same as the surface shape of Comparative Example 2 (FIG. 9B). From the measurement of surface steps using a stylus profilometer (DEK-TAK), it was found that the height of small projections on the contact surface to be joined after the step of removing surface processing agent was 0.2 to 0.5 µm both in Example 2 and Comparative Example 2, without any significant difference. Therefore, it can be understood that even when small projections are formed on the contact surface of first substrate to be joined, they do not affect the step of joining.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a microchip, comprising the steps of:
   forming a first substrate having at least one recess on its surface and small projections of 0.5 to 30 µm in height formed on at least a part of the surface having said recess;
   applying a surface processing agent on the surface having said recess;
   removing said surface processing agent or a coating of said surface processing agent applied to a contact surface to be joined to a second substrate; and
   joining said contact surface to be joined of said first substrate to the second substrate, to obtain a microchip.

2. The method of manufacturing a microchip according to claim 1, wherein
   said small projections are formed at least on the contact surface to be joined to said second substrate.

3. The method of manufacturing a microchip according to claim 1, comprising, after the step of applying the surface processing agent, the step of
   irradiating the surface having said small projections with light, to inspect the state of application of said surface processing agent.

4. The method of manufacturing a microchip according to claim 3, wherein
   the state of application of said surface processing agent is inspected by irradiating the surface having small projections with white light and by observing luminance of diffused reflection from the surface irradiated with white light.

5. The method of manufacturing a microchip according to claim 1, further comprising, after the step of applying said surface processing agent, the step of
   drying the applied surface processing agent to provide a coating; and
   after the step of removing the surface processing agent or the coating formed of said surface processing agent, the step of irradiating the contact surface to be joined to said second substrate with light, to inspect the state of removal of said coating.

6. The method of manufacturing a microchip according to claim 5, wherein
   the state of removal of said coating is inspected by irradiating the contact surface to be joined to said second substrate with white light and by observing luminance of diffused reflection from the surface irradiated with white light.

7. A method of manufacturing a microchip, comprising the steps of:
   forming a first substrate having at least one recess on its surface and small projections of 0.5 to 30 µm in height formed on at least a part of the surface having said recess;
   applying a surface processing agent on the surface having said recess;
   drying the applied surface processing agent to obtain a coating;
   redissolving the coating formed on a contact surface to be joined to a second substrate;
   removing the redissolved coating; and
   joining said contact surface to be joined of said first substrate to the second substrate, to obtain a microchip.

8. The method of manufacturing a microchip according to claim 7, wherein
   said small projections are formed at least on the contact surface to be joined to said second substrate.

9. The method of manufacturing a microchip according to claim 7, comprising, after the step of applying the surface processing agent, the step of
   irradiating the surface having said small projections with light, to inspect the state of application of said surface processing agent.

10. The method of manufacturing a microchip according to claim 9, wherein
    the state of application of said surface processing agent is inspected by irradiating the surface having small projections with white light and by observing luminance of diffused reflection from the surface irradiated with white light.

11. The method of manufacturing a microchip according to claim 7, further comprising, after the step of removing said redissolved coating, the step of irradiating the contact surface to be joined to said second substrate with light, to inspect the state of removal of said redissolved coating.

12. The method of manufacturing a microchip according to claim 11, wherein the state of removal of said redissolved coating is inspected by irradiating the contact surface to be joined to said second substrate with white light and by observing luminance of diffused reflection from the surface irradiated with white light.

* * * * *